United States Patent
Josefsson et al.

(10) Patent No.: US 11,248,969 B2
(45) Date of Patent: Feb. 15, 2022

(54) SYSTEM AND METHOD FOR DETERMINING TEMPERATURE CHANGES OF AN OPTICAL FIBRE

(71) Applicant: SAAB AB, Linkoeping (SE)

(72) Inventors: Roy Josefsson, Hoekerum (SE); Daniel Eckerstroem, Bankeryd (SE)

(73) Assignee: SAAB AB, Linkoeping (SE)

( * ) Notice: Subject to any disclaimer, the term of this patent is extended or adjusted under 35 U.S.C. 154(b) by 430 days.

(21) Appl. No.: 16/269,776

(22) Filed: Feb. 7, 2019

(65) Prior Publication Data
US 2019/0293500 A1    Sep. 26, 2019

(30) Foreign Application Priority Data

Mar. 23, 2018  (SE) .................................. 1850330-0

(51) Int. Cl.
*G01K 11/3206* (2021.01)
*G01D 5/353* (2006.01)
*G01D 3/10* (2006.01)

(52) U.S. Cl.
CPC .......... *G01K 11/3206* (2013.01); *G01D 3/10* (2013.01); *G01D 5/3539* (2013.01); *G01D 5/35316* (2013.01); *G01D 5/35387* (2013.01)

(58) Field of Classification Search
CPC .......... G01D 5/35387; G01D 5/35316; G01D 5/3539; G01D 3/10; G01K 11/32
See application file for complete search history.

(56) References Cited

U.S. PATENT DOCUMENTS 8,050,527 B2 * 11/2011 Noddings .............. G02B 6/443
                                                        385/100
9,612,394 B2 *  4/2017 Schade ............ G01D 5/35374
(Continued)

FOREIGN PATENT DOCUMENTS

EP      2975366 A1    1/2016
EP      3246682 A1   11/2017
(Continued)

OTHER PUBLICATIONS

European Patent Office, Communication pursuant to Article 94(3) EPC received for Application No. 18213337.1, dated Mar. 11, 2021, 8 pages, Sweden.
(Continued)

*Primary Examiner* — Dominic J Bologna
(74) *Attorney, Agent, or Firm* — Alston & Bird LLP

(57) ABSTRACT

A method is provided for determining temperature changes of an optical fibre having Fiber Bragg Grating (FBG) patterns provided in at least one portion (Portion 1) of the optical fibre. The optical fibre is connected between a first detector arrangement and a second detector arrangement. Light is emitted into the optical fibre in a first direction from the first detector arrangement, which receives reflections from the FBG patterns of the emitted light. The reflections are processed for determining a current temperature change related to the optical fibre. On the basis of predetermined criteria, light is emitted into the optical fibre in an opposite second, direction from the second detector arrangement. The second detector arrangement receives reflections from the FBG patterns of the light emitted in the second direction and the reflections are processed for determining a current temperature change related to the optical fibre.

17 Claims, 3 Drawing Sheets

(56) References Cited

U.S. PATENT DOCUMENTS

| | | |
|---|---|---|
| 2005/0111793 A1 | 5/2005 | Grattan et al. |
| 2010/0183258 A1 | 7/2010 | Chow et al. |
| 2011/0058768 A1* | 3/2011 | Swinehart ........ B29D 11/00663 385/13 |
| 2011/0211795 A1* | 9/2011 | Xia .................... G01K 11/3206 385/123 |
| 2012/0328231 A1* | 12/2012 | Yeh ..................... H04B 10/071 385/12 |
| 2016/0018319 A1* | 1/2016 | Hegyi ................ G02B 6/12009 356/73.1 |
| 2016/0025524 A1* | 1/2016 | Nikles .................... G01K 11/32 356/73.1 |
| 2017/0153387 A1* | 6/2017 | Wei .................... G01B 11/2441 |
| 2017/0160109 A1* | 6/2017 | Schade .............. G01D 5/35316 |
| 2019/0277708 A1 | 2/2019 | Miller |
| 2019/0277709 A1 | 2/2019 | Miller et al. |
| 2019/0086243 A1* | 3/2019 | Macdougall ....... G01D 5/35316 |
| 2019/0277669 A1* | 9/2019 | Miller .................... G01K 11/32 |

FOREIGN PATENT DOCUMENTS

| | | |
|---|---|---|
| EP | 3291192 A1 | 3/2018 |
| EP | 3537110 A1 | 9/2019 |
| EP | 3537111 A1 | 9/2019 |
| EP | 3537123 A1 | 9/2019 |
| WO | WO 2015/199590 A1 | 12/2015 |

OTHER PUBLICATIONS

Swedish Patent and Registration Office, Search Report for Application No. 1850330-0, dated Nov. 7, 2018, 2 pages, Sweden.
European Patent Office, Extended European Search Report for European Patent Application No. 18213337.1, dated Jun. 14, 2019, 7 pages, Germany.

* cited by examiner

SYSTEM AND METHOD FOR DETERMINING TEMPERATURE CHANGES OF AN OPTICAL FIBRE

CROSS-REFERENCE TO RELATED APPLICATION

This application claims priority from Swedish Application No. 1850330-0, filed Mar. 23, 2018, the contents of which are hereby incorporated herein in its entirety by reference.

TECHNICAL FIELD

The present invention relates to a method for determination of temperature changes of an optical fibre. In particular the present invention relates to a method for determination of temperature changes of an optical fibre having Fiber Bragg Grating (FBG) patterns provided in at least one portion of said optical fibre, by means of the effect the temperature change has on the wavelength reflected by the FBG. The invention relates also to a computer program product comprising program code for a computer for implementing a method according to the invention. It relates also to a system for determining temperature changes of an optical fibre having Fiber Bragg Grating (FBG) patterns and a platform being equipped with the system. The platform may be an aircraft, such as a commercial aircraft.

BACKGROUND ART

It is known to measure temperature changes along an optical fibre by means of Fibre Bragg Gratings. Hereby a plurality of Fibre Bragg Gratings are inscribed along the optical fibre. Each Fibre Bragg Grating is active in its particular wavelength range within the electromagnetic spectrum and reflects a certain narrow wavelength band, within the particular wavelength range, depending on parameters like temperature, pressure, strain and indices of refraction. The reflected narrow wavelength band has a peak at the Bragg wavelength. A temperature change results in a shift of the peak wavelength. In order to avoid uncertainties regarding which Fibre Bragg Grating that contributes to a certain reflected peak wavelength, each Fibre Bragg Grating is given its unique wavelength range.

One arrangement comprises a light source, detector and processing means, whereby one optical fibre is attached at one end to the arrangement. Hereby parameter changes may be detected and monitored. One such parameter is temperature.

Aircrafts may be equipped with two such arrangements for sake of redundancy. Hereby the arrangements are working in parallel. This is a rather expensive solution because of the fact that the optical fibre comprising Fibre Bragg Gratings is rather expensive.

SUMMARY OF THE INVENTION

There is a need to provide a robust and cost-effective system and method for determining temperature changes on-board e.g. an aircraft.

An object of the present invention is to propose a novel and advantageous method for determining temperature changes of an optical fibre.

Another object of the invention is to propose a novel and advantageous system and a novel and advantageous computer program for determining temperature changes of an optical fibre.

Another object of the present invention is to propose a novel and advantageous method providing a more accurate and robust determination of temperature changes of an optical fibre.

Another object of the invention is to propose a novel and advantageous system and a novel and advantageous computer program providing a cost-effective determination of temperature changes of an optical fibre.

Yet another object of the invention is to propose a method, a system and a computer program achieving an automated, versatile and user friendly determination of temperature changes of an optical fibre.

Yet another object of the invention is to propose an alternative method, an alternative system and an alternative computer program for determination of temperature changes of an optical fibre.

Some of these objects are achieved with a method according to claim 1. Other objects are achieved with a system in accordance with what is depicted herein. Advantageous embodiments are depicted in the dependent claims. Substantially the same advantages of method steps of the proposed method hold true for corresponding means of the proposed system.

According to an aspect of the invention there is provided a method for determining temperature changes of an optical fibre having Fiber Bragg Grating (FBG) patterns provided in at least one portion of said optical fibre, said optical fibre being connected between a first detector arrangement and a second detector arrangement, the method comprising the steps of:

emitting light into said optical fibre in a first direction from said first detector arrangement, receiving reflections from said (FBG) patterns of such emitted light by said first detector arrangement, and processing said reflections for determining a current temperature change related to said optical fibre;

on the basis of predetermined criteria, emitting light into said optical fibre in an opposite, second, direction from said second detector arrangement, receiving reflections from said (FBG) patterns of such emitted light by said second detector arrangement, and processing said reflections for determining a current temperature change related to said optical fibre.

Advantageously the proposed method may provide an accurately determined temperature change along the fibre. Hereby a cost-effective, automated and user friendly method for determining a current temperature change related to said optical fibre is achieved.

The method may comprise the step of determining if said criteria is fulfilled.

The method may comprise the step of:

emitting light from said second detector arrangement if it is determined that said first detector arrangement is not operating properly and/or if it is determined that a disconnection along said optical fibre is at hand. These examples are relating to said criteria. Hereby a versatile and redundant method is achieved.

The method may comprise the step of:

operating only one of said first detector arrangement and said second detector arrangement; or operating, in an alternating manner, said first detector arrangement and said second detector arrangement; or operating both said first detector arrangement and said second detector arrangement simultaneously. Hereby a versatile and flexible method is achieved. The proposed method is robust as down time of the system may be reduced or minimized.

The method may comprise the step of:

determining a position of a temperature change along said optical fibre by performing a combined wavelength division multiplexing and time division multiplexing. By using a combined wavelength division multiplexing and time division multiplexing a highly exact position regarding said temperature change along the fibre may be determined.

The method may comprise the step of:

determining a temperature change course as a basis for a decision regarding how to deal with said temperature change. Hereby a cost-effective and reliable method is achieved. By extrapolating temperature changes on the basis of said determined course a most desired point of time for taking potential actions may be determined. It may for example be determined that the platform on which the proposed system is arranged, should be subject for immediate maintenance/service or that it is possible to wait for a more convenient and desired point of time for performing required maintenance/service.

The method may comprise the step of:

providing a number of optical fibres having Fiber Bragg Grating (FBG) patterns provided in at least one portion of each of said optical fibres, said optical fibres being connected between the first detector arrangement and the second detector arrangement. Hereby a versatile method is achieved wherein various optical fibres may be arranged wherever suitable within the platform.

The method may comprise the steps of:

detecting an identity of a certain optical fibre; and determining a predetermined off-set characteristics related to the Fiber Bragg Grating (FBG) patterns of said certain optical fibre. Hereby accuracy and reliability of the determined temperature changes is achieved.

According to an aspect of the invention there is provided a method for determining parameter changes of an optical fibre having Fiber Bragg Grating (FBG) patterns provided in at least one portion of said optical fibre, said optical fibre being connected between a first detector arrangement and a second detector arrangement, the method comprising the steps of:

emitting light into said optical fibre in a first direction from said first detector arrangement, receiving reflections from said (FBG) patterns of such emitted light by said first detector arrangement, and processing said reflections for determining a current parameter change related to said optical fibre;

on the basis of predetermined criteria, emitting light into said optical fibre in an opposite, second, direction from said second detector arrangement, receiving reflections from said (FBG) patterns of such emitted light by said second detector arrangement, and processing said reflections for determining a current parameter change related to said optical fibre.

Said parameter may be e.g. pressure, strain or vibrations.

According to an aspect of the invention there is provided a method for determining parameter changes of an optical fibre having Fiber Bragg Grating (FBG) patterns provided in at least one portion of said optical fibre, said optical fibre being connected between a first detector arrangement and a second detector arrangement, the method comprising the steps of:

emitting light into said optical fibre in a first direction from said first detector arrangement, receiving reflections from said (FBG) patterns of such emitted light by said first detector arrangement, and processing said reflections for determining a current parameter change related to said optical fibre;

emitting light into said optical fibre in an opposite, second, direction from said second detector arrangement, receiving reflections from said (FBG) patterns of such emitted light by said second detector arrangement, and processing said reflections for determining a current parameter change related to said optical fibre.

According to an aspect of the invention there is provided a system for determining temperature changes of an optical fibre having Fiber Bragg Grating (FBG) patterns provided in at least one portion of said optical fibre, the system comprising:

a first detector arrangement and a second detector arrangement wherein said first detector arrangement and second detector arrangement being connected by fibre;

means being arranged for emitting light into said optical fibre in a first direction from said first detector arrangement, means being arranged for receiving reflections from said (FBG) patterns of such emitted light by said first detector arrangement, and means being arranged for processing said reflections for determining a current temperature change related to said optical fibre;

means being arranged for, on the basis of predetermined criteria, emitting light into said optical fibre in an opposite, second, direction from said second detector arrangement, means being arranged for receiving reflections from said (FBG) patterns of such emitted light by said second detector arrangement, and means being arranged for processing said reflections for determining a current temperature change related to said optical fibre.

The system may comprise:

means being arranged for emitting light from said second detector arrangement if it is determined that said first detector arrangement is not operating properly and/or if it is determined that a disconnection along said optical fibre is at hand The system may comprise:

control means for operating said first detector arrangement and said second detector arrangement in such a way that:

only one of said first detector arrangement and said second detector arrangement is operating; or said first detector arrangement and said second detector arrangement are operating in an in an alternating manner; or said first detector arrangement and said second detector arrangement are operating simultaneously.

The system may comprise:

means being arranged for determining a position of a temperature change along said optical fibre by performing a combined wavelength division multiplexing and time division multiplexing.

The system may comprise:

means being arranged for determining a temperature change course as a basis for a decision regarding how to deal with said temperature change.

The system may comprise:

a number of optical fibres having Fiber Bragg Grating (FBG) patterns provided in at least one portion of each of said optical fibres, wherein said number of optical fibres are arranged to be connected between the first detector arrangement and the second detector arrangement.

The system may comprise:
- means being arranged for detecting an identity of a certain optical fibre; and
- means being arranged for determining a predetermined off-set characteristics related to the Fiber Bragg Grating (FBG) patterns of said certain optical fibre.

According to an aspect of the invention there is provided a system for determining parameter changes of an optical fibre having Fiber Bragg Grating (FBG) patterns provided in at least one portion of said optical fibre, the system comprising:
- a first detector arrangement and a second detector arrangement wherein said first detector arrangement and second detector arrangement being connected by fibre;
- means being arranged for emitting light into said optical fibre in a first direction from said first detector arrangement, means being arranged for receiving reflections from said (FBG) patterns of such emitted light by said first detector arrangement, and means being arranged for processing said reflections for determining a current parameter change related to said optical fibre;
- means being arranged for, on the basis of predetermined criteria, emitting light into said optical fibre in an opposite, second, direction from said second detector arrangement, means being arranged for receiving reflections from said (FBG) patterns of such emitted light by said second detector arrangement, and means being arranged for processing said reflections for determining a current parameter change related to said optical fibre.

According to an aspect of the invention there is provided a platform comprising a system according to what is presented herein. According to an aspect of the invention there is provided a vehicle comprising a system according to what is presented herein.

According to an aspect of the invention there is provided an aircraft comprising a system according to what is presented herein.

The vehicle may be any from among a truck, bus or passenger car.

According to an aspect of the invention there is provided a computer program product comprising instructions which, when the program is executed by a computer, cause the computer to carry out any of the steps of the method depicted herein.

According to an aspect of the invention there is provided a computer-readable storage medium comprising instructions which, when executed by a computer, cause the computer to carry out any of the steps of the method depicted herein.

According to an aspect of the invention there is provided a computer program product comprising instructions which, when the program is executed by an electronic control arrangement, cause the electronic control arrangement to carry out any of the steps of the method depicted herein.

According to an aspect of the invention there is provided a computer-readable storage medium comprising instructions which, when executed by an electronic control arrangement, cause the electronic control arrangement to carry out any of the steps of the method depicted herein.

According to an aspect of the invention there is provided a computer program for determining temperature changes of an optical fibre having Fiber Bragg Grating (FBG) patterns provided in at least one portion of said optical fibre, wherein the computer program comprises program code for causing an electronic control arrangement or a computer connected to the electronic control arrangement to perform anyone of the method steps depicted herein, when run on the electronic control arrangement or the computer.

According to an aspect of the invention there is provided a computer program for determining temperature changes of an optical fibre having Fiber Bragg Grating (FBG) patterns provided in at least one portion of said optical fibre, wherein the computer program comprises program code stored on a computer-readable medium for causing an electronic control arrangement or a computer connected to the electronic control arrangement to perform anyone of the method steps depicted herein.

According to an aspect of the invention there is provided a computer program for determining temperature changes of an optical fibre having Fiber Bragg Grating (FBG) patterns provided in at least one portion of said optical fibre, wherein the computer program comprises program code stored on a computer-readable medium for causing an electronic control arrangement or a computer connected to the electronic control arrangement to perform any one of the method steps depicted herein, when run on the electronic control arrangement or the computer.

According to an aspect of the invention there is provided a computer program product containing a program code stored on a computer-readable medium for performing any one of the method steps depicted herein, when the computer program is run on an electronic control arrangement or a computer connected to the electronic control arrangement.

According to an aspect of the invention there is provided a computer program product containing a program code stored non-volatile on a computer-readable medium for performing any one of the method steps depicted herein, when the computer program is run on an electronic control arrangement or a computer connected to the electronic control arrangement.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of embodiments of the present invention and its further objects and advantages, the detailed description set out below should be read in conjunction with the accompanying drawings, in which the same reference notations denote similar items in the various diagrams, and in which.

DETAILED DESCRIPTION

Figure 1:
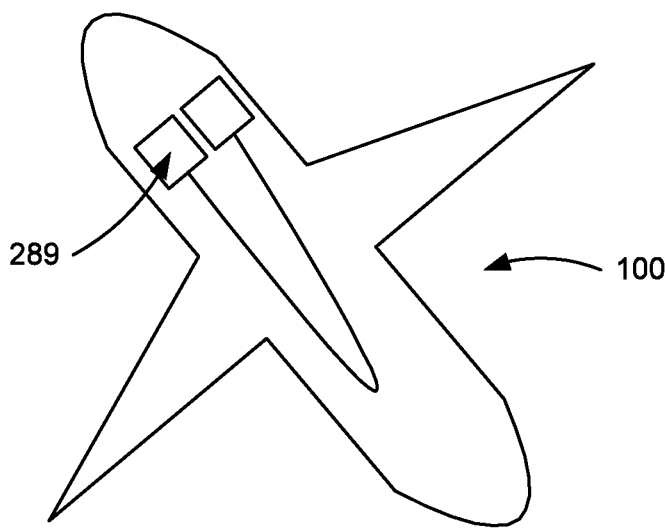
FIG. 1 schematically illustrates a platform according to an embodiment of the invention.

FIG. 1 schematically illustrates a platform 100. According to this example the platform is an aircraft. The aircraft may be a commercial civil aircraft. The platform may be any suitable kind of aircraft, such as a helicopter. The platform 100 comprises the proposed system 289, which is depicted in greater detail with reference to e.g. FIG. 2 below.

Herein the platform 100 may be any suitable vehicle being arranged with the proposed system for determining temperature changes of an optical fibre having Fiber Bragg Grating patterns provided in at least one portion of said optical fibre According to one embodiment the platform is a land vehicle comprising a tractor unit and a trailer. The platform 100 may be a heavy vehicle, e.g. a truck or a bus. It may alternatively be a car. According to one embodiment the platform may be a train.

The method and system are applicable to various vehicles, such as e.g. a mining machine, tractor, dumper, wheel-loader, forest machine, earth mover, road construction vehicle, road planner, emergency vehicle or a tracked vehicle.

The proposed method and the proposed system according to one aspect of the invention are well suited to other platforms than aircraft, e.g. watercraft. The watercraft may be of any kind, e.g. motorboats, steamers, ferries or ships.

The platform may be any suitable stationary facility, such as an apartment complex, house or office building.

The term "link" refers herein to a communication link which may be a physical connection such as an opto-electronic communication line, or a non-physical connection such as a wireless connection, e.g. a radio link or microwave link.

The term "control arrangement" is according to one embodiment herein defined as an arrangement comprising only one electronic control arrangement or a number of connected electronic control arrangements. Said one electronic control arrangement or said number of connected electronic control arrangements may be arranged to perform the steps according to the method depicted herein.

Herein it is depicted that the proposed system is arranged to determine a temperature change along the optical fibre. I should however be noted that the proposed system and method are applicable to detect changes of a number of different parameters, such as pressure, vibrations, humidity, flow or strain.

Figure 2:
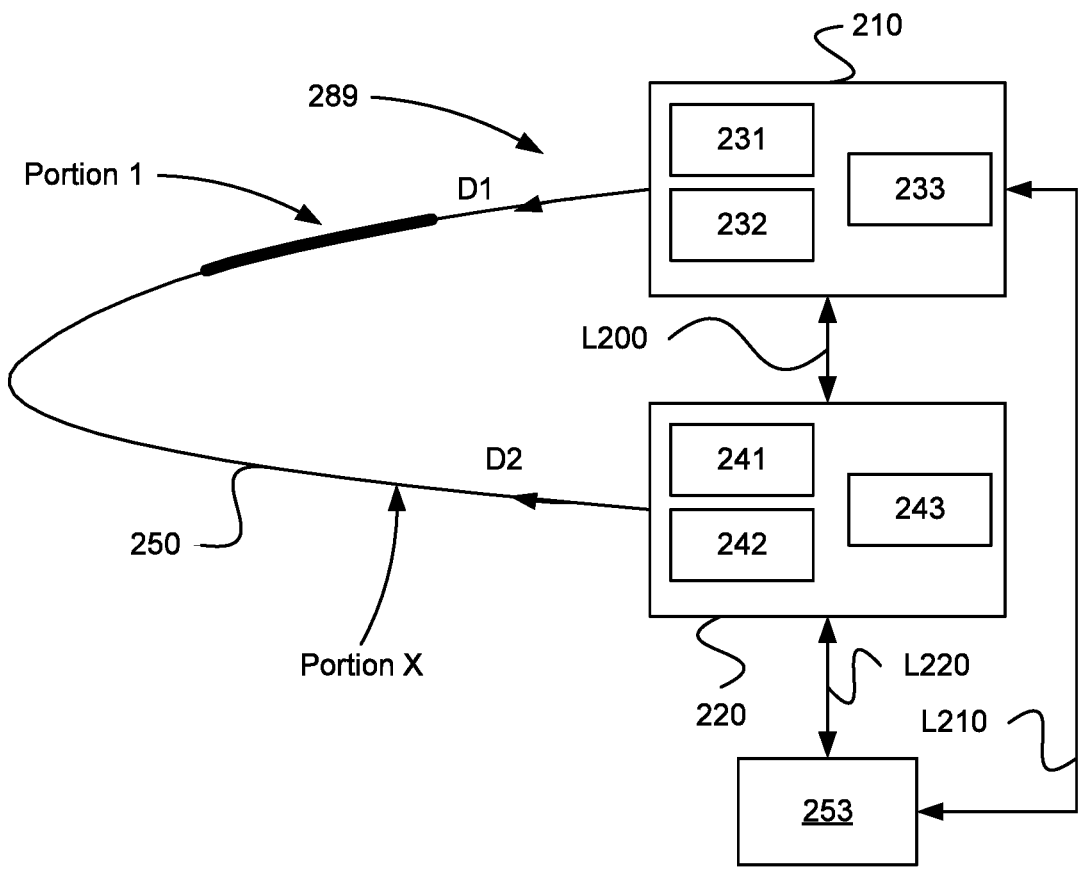
FIG. 2 schematically illustrates a system according to an embodiment of the invention.

FIG. 2 schematically illustrates a system 289 of the platform 100. The system 289 is arranged in the platform 100.

A first detector arrangement 210 comprises a light emitting device 231. The light emitting device 231 is arranged to emit light (radiation) of a predetermined wavelength and bandwidth into an optical fibre 250. The light emitting device may be any suitable light source, such as a superluminescent diode, laser emitting device or semiconductor optical amplifier.

The optical fibre 250 comprises at least one portion of Fiber Bragg Grating (FBG) patterns inscribed in the optical fibre. According to this example the optical fibre 250 comprises a first portion Portion 1 and a second portion Portion X. The first portion Portion 1 comprises Fiber Bragg Grating (FBG) patterns. This is depicted in greater detail with reference to FIG. 3. The second portion Portion X does not comprise any Fiber Bragg Grating (FBG) patterns but is arranged to only transmit the provided light. The optical fibre 250 is arranged between said first detector arrangement 210 and a second detector arrangement 220. Each portion of the optical fibre 250 comprising the FBG patterns may be of any suitable length, such as e.g. 1, 5 or 10 metres. According to one embodiment the optical fibre comprises a number N of separated portions (Portion 1, . . . , Portion N). Each portion Portion 1-Portion N may hereby be separated by a portion Portion X wherein no Fiber Bragg Grating (FBG) patterns are provided.

According to one embodiment the second portion Portion X may be excluded. Hereby there is provided an optical fibre 250 comprising Fiber Bragg Grating (FBG) patterns along the entire length of the optical fibre 250. According to one embodiment FBG's may be equidistantly distributed along the optical fibre 250. Hereby no delays between time division multiplexing time slots along the optical fibre 250 are provided, contrary to typical systems having time division multiplexing (TDM). This may be achieved by the arrangement of selected wavelengths in wavelength division multiplexing (WDM) along the elongation of the optical fibre 250, in relation to the time division multiplexing arrangement.

The first detector arrangement 210 further comprises a light detecting device 232. The light detecting device 232 is arranged to receive reflected light (radiation) from the optical fibre 250. The light detecting device 232 is arranged to detect the received light from the optical fibre. Hereby the light emitting device 231 is arranged to emit light from said first detector arrangement 210 into the optical fibre 250 in a first direction and the light detecting device 232 is arranged to receive reflected light, which thus propagate in a second direction, opposite from said first direction.

The first detector arrangement 210 comprises a first control arrangement 233. The first control arrangement 233 is arranged to control operation of said light emitting device 231 and said light detecting device 232. The first control arrangement is also arranged to perform spectral analysis of the detected light so as to determine potential temperature changes along the optical fibre, i.e. along the portion (Portion1) of the optical fibre 250 comprising the Fiber Bragg Grating patterns.

The second detector arrangement 220 comprises a similar set-up as the first detector arrangement 210 and is functioning in a similar way.

The second detector arrangement 220 comprises a light emitting device 241. The light emitting device 241 is arranged to emit light (radiation) of a predetermined wavelength into an optical fibre 250. The light emitting device 241 may be any suitable light source, such as a superluminescent/superluminous diode (SLD), laser emitting device or semiconductor optical amplifier.

The second detector arrangement 220 further comprises a light detecting device 242. The light detecting device 242 is arranged to receive reflected light (radiation) from the optical fibre 250. The light detecting device 242 is arranged to detect the received light from the optical fibre 250. Hereby the light emitting device 241 is arranged to emit light from said second detector arrangement 220 into the optical fibre 250 in said second direction and the light detecting device 242 is arranged to receive reflected light, which thus propagate in a first direction, opposite from said second direction.

The second detector arrangement 220 comprises a second control arrangement 243. The second control arrangement 243 is arranged to control operation of said light emitting device 241 and said light detecting device 242. The second control arrangement 243 is also arranged to perform spectral analysis of the detected light so as to determine potential temperature changes along the optical fibre 250, i.e. along the portion (Portion 1) of the optical fibre 250 comprising the Fiber Bragg Grating patterns.

According to one embodiment the system 289 is operating by only using the first detector arrangement 210. This is referred to as normal operation. Hereby the first detector arrangement 210 is functioning as a "Master" and the second detector arrangement is functioning as a "Slave".

The first detector arrangement 210 and the second detector arrangement 220 are arranged to determine if a predetermined criteria is fulfilled. Said criteria may relate to that said first detector arrangement 210 is malfunctioning. Said criteria may relate to that there is the optical fibre 250 is malfunctioning, such as a fibre break at any position along the first portion Portion 1.

According to one embodiment the first detector unit 210 and the second detector arrangement 220 are arranged for communication via a link L200. Hereby the first detector arrangement 210 may activate, when suitable, the second detector arrangement 220 for operation. This may be performed in case there is detected a break of the optical fibre 250.

According to one embodiment the second detector arrangement 220 may activate itself for operation. This may be performed in case the first detector arrangement 210 is malfunctioning.

In a case where there is a fibre break at a position of the first portion Portion 1 both the first detector arrangement 210 and the second detector arrangement 220 may be operating, whereby the first detector arrangement 210 is receiving reflections (in a second direction) from FGB's up to said fibre break and the second detector arrangement 220 is receiving reflections (in a first direction) from the from FGB's up to said fibre break.

According to one embodiment the first detector arrangement 210 and the second detector arrangement 220 may be operating in an alternating manner.

Both the first detector arrangement 210 and the second detector arrangement 220 are arranged to determine a position of a temperature change along said optical fibre by performing a combined wavelength division multiplexing and time division multiplexing. Hereby a relatively exact position of a detected temperature change may be determined.

Both the first detector arrangement 210 and the second detector arrangement 220 are arranged to determining a temperature change course as a basis for a decision regarding how to deal with said temperature change. By monitoring a temperature change along the optical fibre 250 over time it may be determined if, and in that case when, any actions are required to be taken. Hereby it may be determined if action is necessary to be taken immediately or if actions may be taken at any suitable occasion, such as at a point of time when maintenance or service of the platform 100 is scheduled.

According to one embodiment a number M of optical fibres having Fiber Bragg Grating (FBG) patterns provided in at least one portion of each of said optical fibres may be provided. Each of said optical fibres is connected between the first detector arrangement 210 and the second detector arrangement 220. According to this embodiment the operation of the system 289 is performed in a similar way as when only one optical fibre is provided. The different optical fibres may be independently arranged at the platform. The individual optical fibres may present a unique distribution of portions having Fiber Bragg Grating patterns. The set-up of optical fibres may be changed, so as to connect more optical fibres to the first detector arrangement 210 and the second detector arrangement 220 or to disconnect one or more optical fibres from the first detector arrangement 210 and the second detector arrangement 220. Hereby a flexible system 289 is provided.

The first detector arrangement 210 and the second detector arrangement 220 may be arranged to detect a unique identity of a certain optical fibre of the system 289. Hereby each of the connected optical fibres is provided with an array of FGB's whereby a corresponding identity may be read out from a spectral analysis performed by the first detector arrangement 210 and/or the second detector arrangement 220. According to this embodiment the first detector arrangement 210 and/or the second detector arrangement 220 have pre-stored information regarding off-set characteristics related to the Fiber Bragg Grating patterns of said certain optical fibre. The off-set characteristics may hereby be used so as to determine temperature changes along the optical fibre in a more accurate way.

A third control arrangement 253 is arranged for communication with the first detector arrangement 210 via a link L210. The third control arrangement 253 is arranged for communication with the second detector arrangement 220 via a link L220. It may be releasably connected to the first detector arrangement 210 and the second detector arrangement 220. It may be a control arrangement external to the platform 100. It may be adapted to performing the steps according to embodiments of the invention. It may be used to cross-load software to the first detector arrangement 210 and the second detector arrangement 220, particularly software for applying the method. It may alternatively be arranged for communication with the first detector arrangement 210 and the second detector arrangement 220 via an internal network on board the platform. It may be adapted to performing functions corresponding to those of the first detector arrangement 210 and the second detector arrangement 220, such as operating the first detector arrangement 210 only, the second detector arrangement 220 only, or both the first detector arrangement 210 and the second detector arrangement 220 simultaneously.

According to one example the proposed method and system are used for detecting hot air leakage from bleed air ducts of aircrafts. This is an implementation which is desirable especially considering the heat-sensitivity of composite materials commonly used in aero-structures.

The proposed systems advantageously achieves a configuration of relatively small weight.

Figure 3:
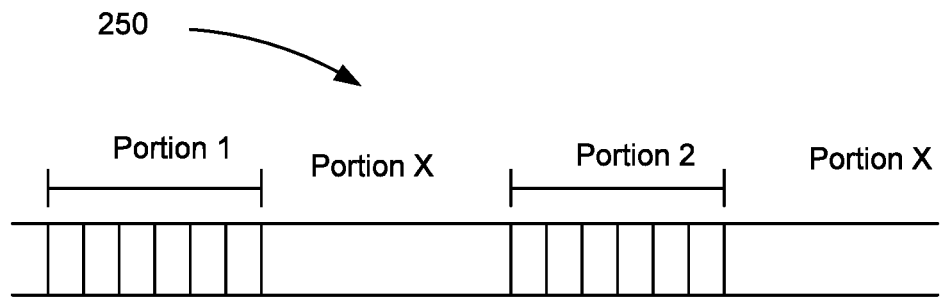
FIG. 3 schematically illustrates a an optical fibre.

FIG. 3 schematically illustrates an optical fibre 250 having Fiber Bragg Grating patterns provided in a first portion Portion 1 and a second portion Portion 2 of said optical fibre 250.

The optical fibre 250 may have any number of portions having Fiber Bragg Grating patterns. The portions having Fiber Bragg Grating patterns are separated by portions Portion X where no Fiber Bragg Grating patterns are provided. Each portion having Fiber Bragg Grating patterns may be of any suitable length, such as 10, 50 or 100 meters, or more. The FGB's in each portion may be separated by any suitable distance, such as for example 2.0 cm.

By performing a combined wavelength division multiplexing and time division multiplexing by means of e.g. the first control arrangement 231 it may be determined which unique FGB is subjected to a temperature change. By performing a combined wavelength division multiplexing and time division multiplexing by means of e.g. the first control arrangement 231 it may be determined which unique FGB is subjected to a parameter change, e.g. a pressure change, strain change, or other.

According to one embodiment the total lengths of the portions having Fiber Bragg Grating patterns constitutes less than 50% of the total length of the optical fibre 250. According to one embodiment the total lengths of the portions having Fiber Bragg Grating patterns constitutes less than 25% of the total length of the optical fibre 250. This advantageously achieves a relatively cheap system.

According to one embodiment substantially the entire length of the optical fibre is constituted of Fiber Bragg Grating patterns, meaning that no portion Portion X is provided.

Advantageously the length of the core of the optical fibre is slightly longer than the casing of the optical fibre. By configuring the optical fibre in this way the risk for unwanted strain affecting the wavelengths of the light reflected by the FGB's are reduced, minimized or eliminated. Hereby an accurate method and system according to an aspect is achieved.

Figure 4A:
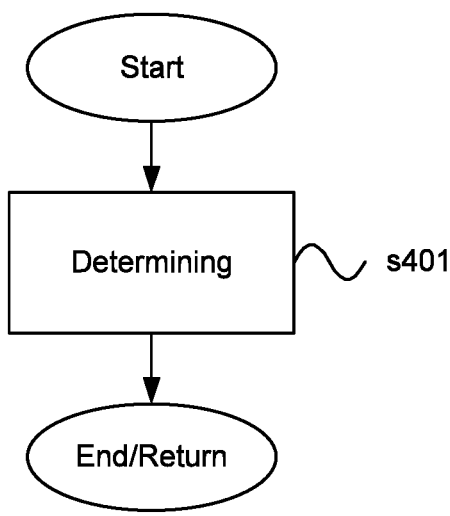
FIG. 4a is a schematic flowchart of a method according to an embodiment of the invention.

FIG. 4a schematically illustrates a flow chart of a method for determining temperature changes of an optical fibre 250 having Fiber Bragg Grating (FBG) patterns provided in at least one portion Portion 1 of said optical fibre 250, said optical fibre 250 being connected between a first detector arrangement 210 and a second detector arrangement 220. The method comprises a method step s401. The method step s401 comprises the steps of:

emitting light into said optical fibre 250 in a first direction D1 from said first detector arrangement 210, receiving reflections from said patterns of such emitted light by said first detector arrangement 210, and processing said reflections for determining a current temperature change related to said optical fibre 250;

on the basis of predetermined criteria, emitting light into said optical fibre 250 in an opposite, second, direction D2 from said second detector arrangement 220, receiving reflections from said patterns of such emitted light by said second detector arrangement 220, and processing said reflections for determining a current temperature change related to said optical fibre 250.

After the method step s401 the method ends/is returned.

Figure 4B:
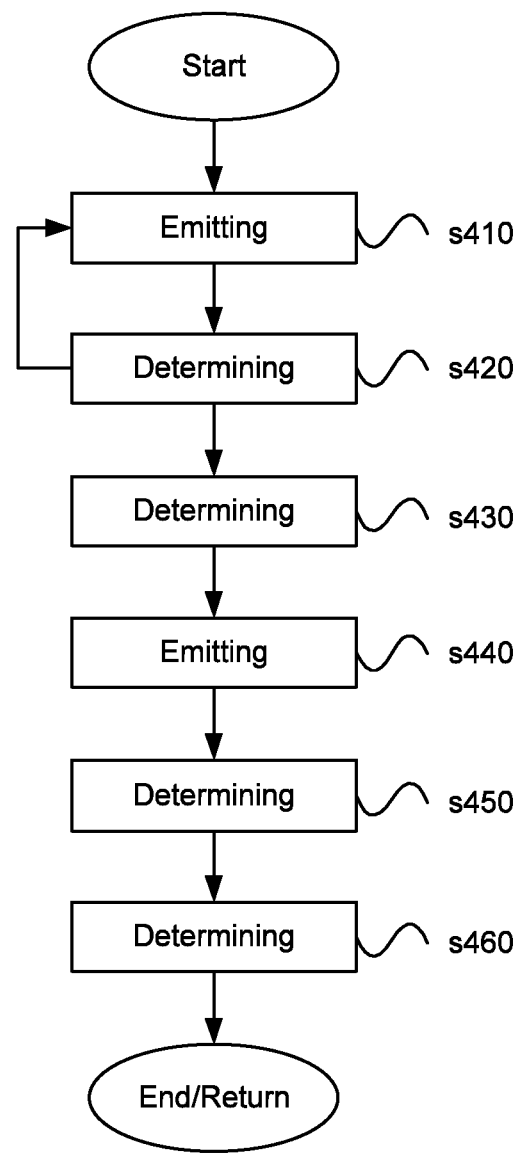
FIG. 4b is a schematic flowchart of a method according to an embodiment of the invention.

FIG. 4b schematically illustrates a flow chart of a method for determining temperature changes of an optical fibre 250 having Fiber Bragg Grating patterns provided in at least one portion Portion 1 of said optical fibre 250, said optical fibre 250 being connected between a first detector arrangement 210 and a second detector arrangement 220.

The method comprises a method step s410. The method step s410 comprises the step of emitting light into said optical fibre 250 in a first direction D1 from said first detector arrangement 210, receiving reflections from said (FBG) patterns of such emitted light by said first detector arrangement 210, and processing said reflections for determining a current temperature change related to said optical fibre 250. This is referred to as normal operation of the system 289, namely that only the first detector arrangement 210 is operating.

After the method step s410 a subsequent method step s420 is performed.

The method step s420 comprises the step of determining if a predetermined criteria is fulfilled. The criteria may be that said first detector arrangement 210 is not operating properly and/or if it is determined that a disconnection along said optical fibre 250 is at hand. The criteria may be that said first detector arrangement 210 is shut down for some reason. This may be performed by means of any one of said first control arrangement 233, second control arrangement 243 or third control arrangement 253. If the criteria is fulfilled a subsequent method step s430 is performed. If the criteria is not fulfilled, the method step s410 is performed again.

The method step s430 comprises the step of determining operation of the system 289. The method step s430 may comprise the step of operating only one of said first detector arrangement 210 and said second detector arrangement 220. Operating only the first detector arrangement 210 may be performed as normal operation. Operating only the second detector arrangement 220 may be performed if the first detector arrangement 210 is malfunctioning.

The method step s430 may comprise the step of operating, in an alternating manner, said first detector arrangement 210 and said second detector arrangement 220. This may be performed when it is desired to switch operation between said first detector arrangement 210 and said second detector arrangement 220.

The method step s430 may comprise the step of operating both said first detector arrangement 210 and said second detector arrangement 220 simultaneously. This may be performed in a case when there is a disconnection somewhere along the optical fibre, e.g. at a position within the first portion Portion 1.

In case operation is determined to involve operation of the second detector arrangement 220 a method step s440 is performed.

The method step s440 comprises the step of, on the basis of predetermined criteria, emitting light into said optical fibre 250 in an opposite, second, direction D2 from said second detector arrangement 220, receiving reflections from said patterns of such emitted light by said second detector arrangement 220, and processing said reflections for determining a current temperature change related to said optical fibre 220.

After the method step s440 a method step s450 is performed.

The method step s450 comprises the step of determining a position of a temperature change along said optical fibre by performing a combined wavelength division multiplexing and time division multiplexing. This is explained in greater detail with reference to FIG. 3.

The method step s450 comprises the steps of:
detecting an identity of a certain optical fibre 250; and
determining a predetermined off-set characteristics related to the Fiber Bragg Grating (FBG) patterns of said certain optical fibre 250.

It should be noted that the steps of detecting an identity of a certain optical fibre 250 and determining corresponding predetermined off-set characteristics may be performed at any suitable point of time, such as a first step of the proposed method or during a platform service event.

The relevant pre-stored off-set characteristics may be determined by means of said first control arrangement 233, said second control arrangement 243 or said third control arrangement 253. Hereby the identity of the optical fibre 250 is determined by means of a fibre unique Fiber Bragg Grating (FBG) pattern. Hereby off-set values for each FBG of the identified fibre 250 are provided. The relevant off-set values may be used when determining a temperature change by the proposed method and system.

In case there is provided a number of optical fibres having Fiber Bragg Grating (FBG) patterns provided in at least one portion of each of said optical fibres, said optical fibres being connected between the first detector arrangement 210 and the second detector arrangement 220, each fibre may be identified according to above and relevant off-set values for each FBG of the identified fibres are provided.

After the method step s450 a method step s460 is performed.

The method step s460 comprises the step of determining a temperature change course as a basis for a decision regarding how to deal with said temperature change. By determining said course it may be determined, e.g. by simulations/calculations/modelling, if it is necessary to perform maintenance of the platform. If it is determined that maintenance should be performed it may also be determined at what point of time such measures should be taken. The decision may be taken by any suitable means, such as the first control arrangement 231 or at a platform management centre. In case the decision is taken externally of the platform temperature change course data may be provided to the decision making unit by a suitable link (not shown).

After the method step s460 the method ends/is returned.

Figure 5:
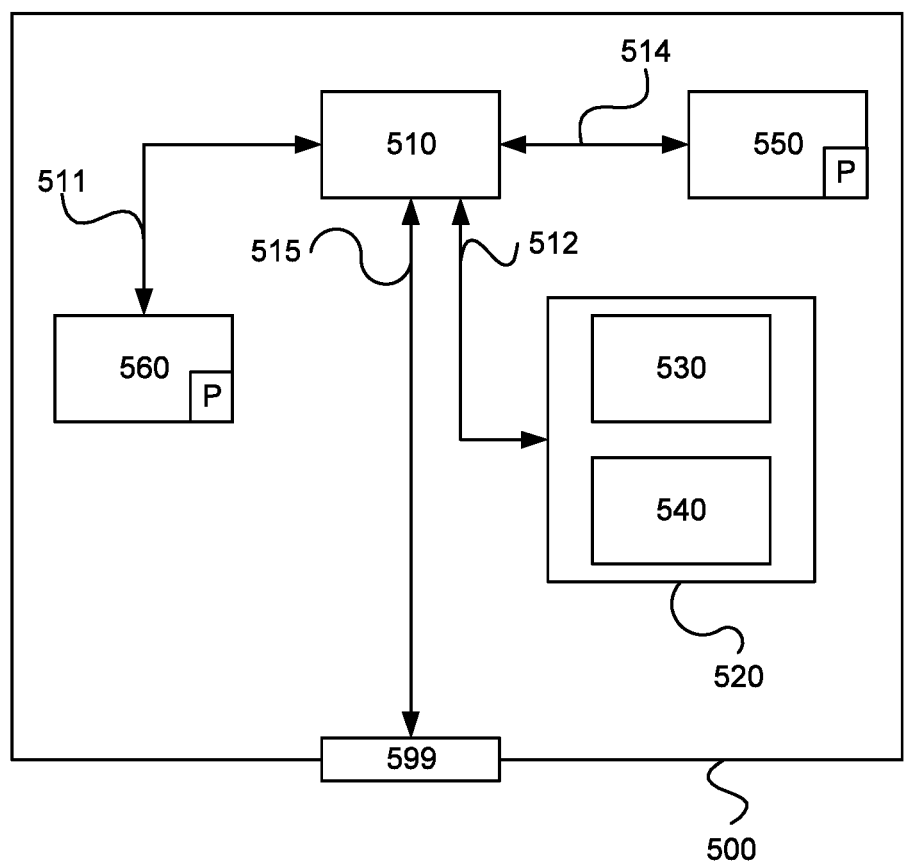
FIG. 5 schematically illustrates a computer according to an embodiment of the invention.

FIG. 5 is a diagram of one version of a device 500. The control arrangements 233, 243 and 253 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for determining temperature changes of an optical fibre 250 having Fiber Bragg Grating patterns provided in at least one portion Portion 1 of said optical fibre 250, said optical fibre 250 being connected between a first detector arrangement 210 and a second detector arrangement 220.

The computer program P may comprise routines for emitting light into said optical fibre 250 in a first direction D1 from said first detector arrangement 210, receiving reflections from said (FBG) patterns of such emitted light by said first detector arrangement 210, and processing said reflections for determining a current temperature change related to said optical fibre 250.

The computer program P may comprise routines for, on the basis of predetermined criteria, emitting light into said optical fibre 250 in an opposite, second, direction D2 from said second detector arrangement 220, receiving reflections from said patterns of such emitted light by said second detector arrangement 220, and processing said reflections for determining a current temperature change related to said optical fibre 250.

The computer program P may comprise routines for controlling emission of light from said second detector arrangement 220 if it is determined that said first detector arrangement 210 is not operating properly and/or if it is determined that a disconnection along said optical fibre 250 is at hand The computer program P may comprise routines for controlling operation of only one of said first detector arrangement 210 and said second detector arrangement 220. The computer program P may comprise routines for controlling operation, in an alternating manner, of said first detector arrangement 210 and said second detector arrangement 220. The computer program P may comprise routines for controlling operation of both said first detector arrangement 210 and said second detector arrangement 220 simultaneously.

The computer program P may comprise routines for determining a position of a temperature change along said optical fibre 250 by performing a combined wavelength division multiplexing and time division multiplexing.

The computer program P may comprise routines for determining a temperature change course as a basis for a decision regarding how to deal with said temperature change.

The computer program P may comprise routines for:
detecting an identity of a certain optical fibre; and
determining a predetermined off-set characteristics related to the Fiber Bragg Grating patterns of said certain optical fibre.

The computer program P may comprise routines for performing any of the process steps detailed with reference to FIG. 4*a* and FIG. 4*b*.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L200, L210 and L220, for example, may be connected to the data port 599 (see FIG. 2).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The invention claimed is:

1. A method for determining temperature changes of an optical fibre (250) having Fiber Bragg Grating (FBG) patterns provided in at least one portion (Portion 1) of said optical fibre (250), said optical fibre (250) being connected between a first detector arrangement (210) and a second detector arrangement (220), wherein said first detector arrangement (210) comprises a first light emitting device (231), a first light detecting device (232) and a first control arrangement (233; 500), wherein said second detector arrangement (220) comprises a second light emitting device (241), a second light detecting device (242) and a second control arrangement (243; 500), the optical fibre (250) comprises a core and a casing, wherein the length of the core of the optical fibre (250) is longer than the casing of the optical fibre (250); the method comprising the steps of:

emitting (s410) light into said optical fibre (250) in a first direction (D1) from said first detector arrangement (210), receiving reflections from said patterns of such emitted light by said first detector arrangement (210), and processing said reflections for determining a current temperature change related to said optical fibre (250);

on the basis of predetermined criteria, emitting (s440) light into said optical fibre (250) in an opposite, second, direction (D2) from said second detector arrangement (220), receiving reflections from said patterns of such emitted light by said second detector arrangement (220), and processing said reflections for determining a current temperature change related to said optical fibre (250).

2. The method according to claim 1, comprising the step of:

emitting (s420) light from said second detector arrangement (220) if it is determined that said first detector arrangement (210) is not operating properly and/or if it is determined that a disconnection along said optical fibre (250) is at hand.

3. The method according to claim 1, comprising the step of:

operating (s430) only one of said first detector arrangement (210) and said second detector arrangement (220); or operating (s430), in an alternating manner, said first detector arrangement (210) and said second detector arrangement (220); or operating (s430) both said first detector arrangement (210) and said second detector arrangement (220) simultaneously.

4. The method according to claim 1, comprising the step of:

determining (s450) a position of a temperature change along said optical fibre (250) by performing a combined wavelength division multiplexing and time division multiplexing.

5. The method according to claim 1, comprising the step of:

determining a temperature change course as a basis for a decision regarding how to deal with said temperature change.

6. The method according to claim 1, comprising the step of:

providing a number of optical fibres having Fiber Bragg Grating (FBG) patterns provided in at least one portion of each of said optical fibres, said optical fibres being connected between the first detector arrangement (210) and the second detector arrangement (220).

7. The method according to claim 6, comprising the steps of:

detecting (s450) an identity of a certain optical fibre; and determining (s450) a predetermined off-set characteristics related to the Fiber Bragg Grating (FBG) patterns of said certain optical fibre (250).

8. A non-transitory computer-readable storage medium comprising instructions which, when executed by a computer (200; 210), cause the computer (200; 210) to carry out the method according to claim 1.

9. A system (289) for determining temperature changes of an optical fibre (250) having Fiber Bragg Grating (FBG) patterns provided in at least one portion (Portion 1) of said optical fibre (250), the system comprising:

a first detector arrangement (210) and a second detector arrangement (220) wherein said first detector arrangement (210) and second detector arrangement (220) being connected by said optical fibre (250);

said first detector arrangement (210) comprises a first light emitting device (231), a first light detecting device (232) and a first control arrangement (233; 500);

said first light emitting device (231) being arranged for emitting light into said optical fibre (250) in a first direction (D1) from said first detector arrangement (210), said first light detecting device (232) being arranged for receiving reflections from said FBG patterns of such emitted light by said first detector arrangement (210), and said first control arrangement (233; 500) being arranged for processing said reflections for determining a current temperature change related to said optical fibre (250);

said second detector arrangement (220) comprises a second light emitting device (241), a second light detecting device (242) and a second control arrangement (243; 500);

said second light emitting device (241) being arranged for, on the basis of predetermined criteria, emitting light into said optical fibre (250) in an opposite, second, direction (D2) from said second detector arrangement (220), said second light detecting device (242) being arranged for receiving reflections from said FBG patterns of such emitted light by said second detector arrangement (220), and said second control arrangement (243; 500) being arranged for processing said reflections for determining a current temperature change related to said optical fibre (250);

the optical fibre (250) comprises a core and a casing, wherein the length of the core of the optical fibre (250) is longer than the casing of the optical fibre (250).

10. The system according to claim 9, comprising:

said second light emitting device (241) being arranged for emitting light from said second detector arrangement (220) if it is determined that said first detector arrangement (210) is not operating properly and/or if it is determined that a disconnection along said optical fibre (250) is at hand.

11. The system according to claim 9, comprising:

control arrangements (233; 243; 253) for operating said first detector arrangement (210) and said second detector arrangement (220) in such a way that:

only one of said first detector arrangement (210) and said second detector arrangement (220) is operating; or said first detector arrangement (210) and said second detector arrangement (220) are operating in an in an alternating manner; or said first detector arrangement (210) and said second detector arrangement (220) are operating simultaneously.

12. The system according to claim 9, comprising:

control arrangements (233; 243; 253; 500) being arranged for determining a position of a temperature change along said optical fibre (250) by performing a combined wavelength division multiplexing and time division multiplexing.

13. The system according to claim 9, comprising:

control arrangements (233; 243; 253; 500) being arranged for determining a temperature change course as a basis for a decision regarding how to deal with said temperature change.

14. The system according to claim 9, comprising:

a number of optical fibres having Fiber Bragg Grating (FBG) patterns provided in at least one portion (Portion 1) of each of said optical fibres, wherein said number of optical fibres are arranged to be connected between the first detector arrangement (210) and the second detector arrangement (220).

15. The system according to claim 9, comprising:

detector arrangements (210; 220) being arranged for detecting an identity of a certain optical fibre; and control arrangements (233; 243; 253; 500) being arranged for determining a predetermined off-set characteristics related to the Fiber Bragg Grating (FBG) patterns of said certain optical fibre.

16. A platform (100) comprising a system (289) according to claim 9.

17. An aircraft comprising a system (289) according to claim 9.

* * * * *